United States Patent Office 3,657,207
Patented Apr. 18, 1972

3,657,207
HOMO- AND COPOLYMERS OF 4-VINYL-AZETIDINONE-2 AND PROCESS FOR THEIR MANUFACTURE
Herbert Bestian, Frankfurt am Main, Eduard Kaiser, Kelkheim, Taunus, and Helmut Korbanka, Hofheim, Taunus, Germany, assignors to Farbwerke Hoechst Aktiengesellschaft vormals Meister Lucius & Bruning, Frankfurt am Main, Germany
No Drawing. Filed Oct. 13, 1969, Ser. No. 865,968
Claims priority, application Germany, Oct. 25, 1968, P 18 05 045.8
Int. Cl. C08f 5/00, 17/00
U.S. Cl. 260—88.3 L       3 Claims

ABSTRACT OF THE DISCLOSURE

Homo- and copolymers of 4-vinyl-azetidinone-2 are provided which are polymerized at the vinyl group in the presence of free radical initiators and carry lateral lactam rings.

---

The present invention relates to polymers of 4-vinyl-azetidinone-2 in which the macromolecular main chain is free from nitrogen and cannot be split by saponification.

Homo- and copolymers of N-vinyllactams, for example of the formula

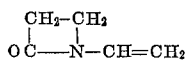

and processes for their manufacture are known in the art. The said N-vinyllactams are rather stable compounds which may be reacted at elevated temperature and thus homo- and copolymerized also at the vinyl group. In polymerizations of this type the lactam ring is maintained even with rings of high ring tension, for example in the case of a 4-membered ring. This stability can be attributed to the substitution of the nitrogen atom.

4-membered lactams in which the nitrogen atom does not carry a substituent and which have the formula

are highly unstable. The 4-methyl-azetidinone-2, for example, is substantially transformed in the distillation under atmospheric pressure into the polymeric amide of the nylon-3 type with cleavage of the 4-membered ring.

Polymers of 4-vinyl-azetidinone-2 of the formula

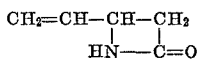

having amide linkages in the macromolecular main chain have also been proposed.

A general synthesis for lactams having 4-membered rings and used as starting compounds is described in Liebigs Ann. Chem. 661 (1963), page 111. In this manner also 4-vinyl-azetidinone can be prepared.

The present invention provides homopolymers of 4-vinyl-azetidinone-2 and copolymers consisting of 99 to 0.5% by weight, preferably 30 to 2% by weight of 4-vinyl-azetidione-2 and 1 to 99.5% by weight, preferably 70 to 98% by weight of other polymerizable ethylenically unsaturated compounds, which polymers have a macromolecular main chain exclusively composed of —C—C— linkages and carrying lateral azetidinone rings of the structure

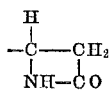

The present invention also provides a process for the manufacture of polymers, i.e. homopolymers and copolymers, by polymerizing 4-membered lactams in the presence of free radical polymerization catalysts, which comprises using 4 - vinyl-azetidinone-2 as 4-membered lactam.

The homopolymers of the present invention can be defined as:

(a) poly-(4-vinyl-azetidinone-2) in which the macromolecular main chain is free from nitrogen, or
(b) poly - (4-vinyl-azetidinone-2) the macromolecular main chain of which cannot be split by saponification, or

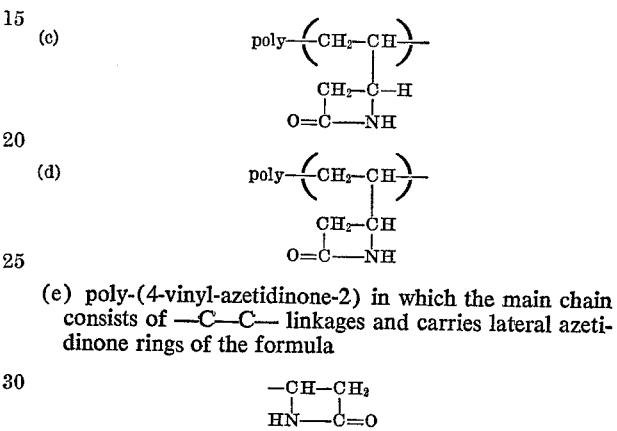

(e) poly-(4-vinyl-azetidinone-2) in which the main chain consists of —C—C— linkages and carries lateral azetidinone rings of the formula

The homopolymers are characterized by an average molecular weight corresponding to an intrinsic viscosity [η] in the range of from 0.02 to 0.2 dl./g., measured in dimethyl formamide at 25° C.

The copolymers according to the invention can be defined as follows:

(f) copolymers consisting of 99 to 0.5% by weight, preferably 30 to 2% by weight, of 4-vinyl-azetidinone-2 structural units and 1 to 99.5% by weight, preferably 70 to 98% by weight, of structural units of at least one other polymerizable ethylenically unsaturated compound, or
(g) copolymers consisting of 99 to 0.5% by weight, preferably 30 to 2% by weight, of structural units of 4-vinyl-azetidinone-2 and 1 to 99.5% by weight, preferably 70 to 98% by weight, of structural units of at least one other polymerizable, ethylenically unsaturated compound, in which copolymers the main chain consists of —C—C— linkages.

Copolymers according to the invention of 4-vinyl-azetidinone-2 and, for example ethylene, styrene, acrylonitrile, vinyl acetate and vinyl propionate, respectively, having average molecular weights (viscosity average or number average) in the range of from 1,000 to 1,000,000, preferably 1,000 to 200,000, can be characterized by the following formulae

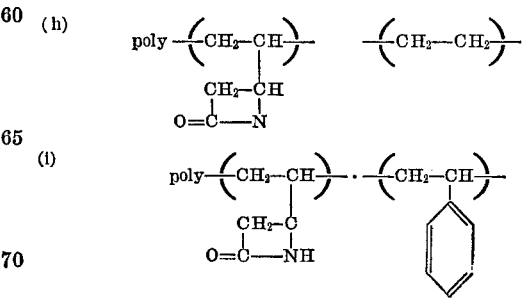

(j) 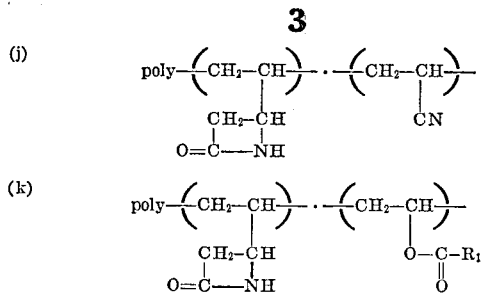

(k)

in which $R_1$ stands for $CH_3$ or $C_2H_5$.

Terpolymers according to the invention consisting, for example, of 4-vinyl-azetidinone-2, ethylene and an unsaturated acid such as crotonic acid, acrylic acid or methacrylic acid can be defined by formulae (f) and (g) and by the following formulae

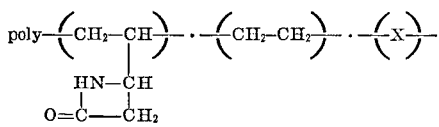

in which X may have the following meaning (1) 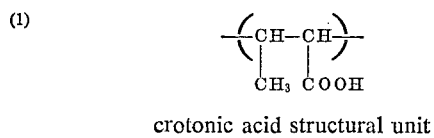

crotonic acid structural unit (2) 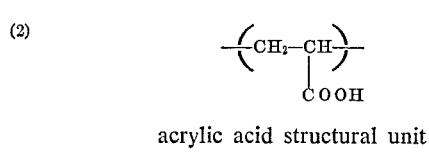

acrylic acid structural unit (3) 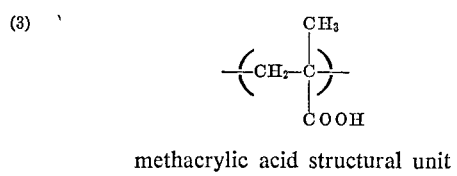

methacrylic acid structural unit

The terpolymers have an average molecular weight (viscosity average or number average) in the range of from 1,000 to 1,000,000, preferably 1,000 to 200,000.

The polymerization can be carried out in substance or in the presence of solvents or diluents in the form of a solution polymerization or precipitation polymerization and also as dispersion polymerization. It may be performed either continuously or discontinuously. As solvents or diluents there may be used all liquids that do not prevent polymerization. Especially suitable are aliphatic and aromatic hydrocarbons, alcohols, ketones, halogenated hydrocarbons, esters, ethers, or amides, such as hexane, benzene, toluene, methanol, isopropanol, tert. butanol, acetone, methyl acetate, ethyl acetate, tetrahydrofurane, dioxane, dimethyl formamide, dimethyl sulfoxide, water, as well as mixtures of the aforesaid substances.

Copolymers of 4-vinyl-azetidinone-2 and other copolymerizable compounds are prepared from 0.5 to 99% by weight, preferably 2 to 30% by weight, of 4-vinyl-azetidinone-2 and 99.5% to 1% by weight, preferably 98 to 70% by weight of at least one copolymerizable ethylenically unsaturated compound, for example unsaturated hydrocarbons, vinyl halides, vinyl esters, vinyl ethers, unsaturated acids, the anhydrides, esters or amides thereof, unsaturated nitriles, N-vinylamides and N-vinyl-lactams, such as ethylene, butadiene, styrene, vinyl chloride, vinylidene chloride, vinyl acetate, vinyl-isobutyl ether, acrylic acid, methacrylic acid, crotonic acid, maleic anhydride, acrylic acid methyl ester, acrylic acid-2-ethyl-hexyl ester, methacrylic acid methyl ester, acryl amide, acrylonitrile, N-vinyl-N-methyl-acetamide, N-vinyl - N - methylform-amide, N-vinyl-pyrrolidone, N-vinyl-caprolactam or vinylsulfonamide.

The polymerization is carried out at a temperature below 250° C. It is advantageous to choose as low as possible a temperature. The homopolymerization as well as the copolymerization with most of the comonomers can be carried out at a temperature in the range of from 0 to 120° C. When ethylene and optionally further monomers are used in the copolymerization it is favorable to operate at temperatures in the range of from 100 to 200° C. to increase the polymerization rate.

The polymerization is carried out at atmospheric pressure or under elevated pressure. It is suitable to operate under elevated pressure when comonomers are used the boiling point of which is below the chosen polymerization temperature. In case ethylene is used as comonomer higher pressures of from 10 to 4000 atmospheres, preferably 300 to 2500 atmospheres, are necessary.

To initiate the polymerization all substances can be used which form radicals under the reaction conditions, such as peroxides, acyl peroxide, peresters, hydroperoxides, aliphatic azo compounds, persulfates, hydrogen peroxide. There are preferably used peroxides such as di-tertiary butyl peroxide and azo compounds such as azobisisobutyronitrile. The use of redox systems is likewise possible.

Poly-4-vinyl-azetidinone-2 is a hard and brittle mass which is soluble in dimethyl formamide, dimethyl sulfoxide, 4-vinyl-azetidinone-2 and water-containing acetonitrile, tetrahydrofurane and butyrolactam. It is insoluble in hexane, acetone, ether and methanol. It becomes soft at a temperature above 140° C. and forms a viscous melt at 170 to 200° C.

The copolymers of 4-vinyl-azetidinone-2 are solid colorless substances having the nature of a plastic, wax, horn, or rubber or are soft or tacky, depending on the type and content of comonomer used.

The homopolymers have an average molecular weight in the range of from 1000 to 50,000, preferably 1000 to 10,000. The average molecular weight of the copolymers is in the range of from 1000 to 1,000,000 preferably 1000 to 200,000.

To determine the molecular weight the cryoscopic method is used for the lower range and light scattering and the osmotic method in the higher range. In general, the intrinsic viscosity $[\eta]$ is used as measurement for the molecular weight. The products according to the invention have an intrinsic viscosity $[\eta]$ of from .02 to 5 dl./g., preferably 0.03 to 3.0 dl./g.

As measurement for the broadness of the molecular weight distribution there is used the ratio $\overline{M}_w$ to $\overline{M}_n$, in defined, for example, by light scattering, and $\overline{M}_0$ is the osmotic method. The ratio of $\overline{M}_w$ to $\overline{M}_n$ can be in the of $\overline{M}_w$ to $\overline{M}_n$ can be influenced within certain limits by the osmotic method. The ratio of $M_n$ to $M_w$ can be in the range of from 1.5 to 20, preferably 2 to 10. Lower values indicate a higher uniformity than higher values. The ratio of $M_w$ to $M_n$ can be influenced within certain limits by the height of the temperature, temperature variations, the conversion and the addition of compounds with regulating effect.

The copolymers according to the invention constitute statistical copolymers in the sense of the copolymerization theory (cf. L. Küchler "Polymerisationskinetic," Springer Verlag Berlin, 1951, pages 160 et seq.). The formation of block polymers in which long sequences of 4-vinyl-azetidinone-2 structural units alternate with large sequences of structural units of another monomer is improbable.

The copolymerization parameters $r_1$ and $r_2$ of the systems acrylonitrile/4 - vinyl-azetidinone-2 and vinyl acetate/4-vinyl-azetidinone-2 yield for 4-vinyl-azetidinone-2 the following Q and $e$-values: $Q=0.027$; $e=-0.82$ (for the definition of the Q and $e$ values cf. Brandrup/Immergut, eds. Polymer Handbook, Interscience Publishers, New York, 1966, page II/341).

A characteristic property of the homopolymers as well as the copolymers is the high reactivity of the lactam ring. By acid and alkaline hydrolysis the salts of the β-aminocarboxylic acids are obtained. Acid alcoholysis yields the salts of β-aminoacid esters, whereas the aminolysis leads to β-aminoacid amides.

The products according to the invention can be used as such without further chemical reaction for the manufacture of lacquers.

The following examples serve to illustrate the invention, the parts and percentages being by weight unless otherwise stated.

EXAMPLE 1

In a flask provided with reflux condenser and nitrogen blanket, 50 parts of 4-vinyl-azetidinone-2 and 1.6 parts of azoisobutyronitrile were scavenged with pure nitrogen and heated for 110 hours at 70° C.

By precipitation with ether there were separated from the viscous polymer solution 13 parts, corresponding to a conversion of 26%, of a colorless to slightly yellow solid having the following properties:

elementary analysis (percent): C, 67.7; H, 7.7; N, 14.3
softening point: 140° C.
characteristic IR bands at 3180, 1740, 1640, 1505 cm.$^{-1}$
intrinsic viscosity: 0.048 dl./g., measured in dimethyl formamide at 25° C.

The solid was soluble in dimethyl formamide, dimethyl sulfoxide, 4-vinyl-azetidinone-2, aqueous acetonitrile, tetrahydrofurane and butyrolactone, and insoluble in hexane, acetone, ether and methanol.

For further definition of the polymer the following reactions were carried out:

(1) 2 parts of the polymer and 5 parts of aqueous hydrochloric acid of 20% strength were boiled for 5 hours, the reaction product was precipitated with acetone, repeatedly dissolved in water and reprecipitated with acetone and carefully dried.

elementary analysis (percent): C, 44.0; H, 6.8; N, 10.3; Cl, 19.0
characteristic IR bands at 3340, 2850–2200, 1710, 1610, 1490 cm.$^{-1}$ The elementary analysis and the infrared spectrum revealed that about 85% by weight of the structural unit of the macromolecular main chain $$-CH_2-CH-$$
$$\quad\quad |$$
$$\quad\quad CH-CH_2$$
$$\quad\quad |\quad\quad |$$
$$\quad\quad H-N——C=O$$

had been transformed into the structural unit

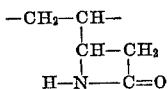

(2) 2 parts of the polymer and 5 parts of a 5 molar ethanolic hydrochloric acid were boiled for 5 hours, the reaction product was precipitated with ether, repeatedly dissolved in methanol and reprecipitated with ether, and carefully dried.

elementary analysis (percent): C, 49.0; H, 7.8; N, 8.9; Cl, 16.8
characteristic IR bands at 3340, 2940–2330, 1726, 1640, 1510, 1027 cm.$^{-1}$
intrinsic viscosity [η] 0.04 dl./g., measured in dimethyl formamide at 25° C.

The elementary analysis and the infrared spectrum prove that about 88% by weight of the structural unit of the macromolecular main chain

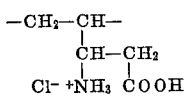

had been transformed into the structural unit

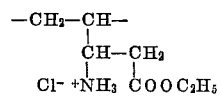

EXAMPLE 2

An autoclave with stirrer was charged with 400 grams of 4-vinyl-azetidinone-2 and 2000 milliliters of benzene. The air in the autoclave was entirely removed by means of ethylene and ethylene was introduced until the pressure had risen to 200 atmospheres. The autoclave was then heated at 120° C. and the ethylene pressure increased to 500 atmospheres. With the aid of a dosing pump a solution of 30 grams of azobisisobutyronitrile in 1000 milliliters of benzene was then pumped into the autoclave over a period of 45 minutes. During this period of time the reaction mixture was maintained at 120° C. and thoroughly stirred. When the polymerization started a fall in pressure was observed. To maintain a pressure of 500 atmospheres ethylene was continuously introduced. When the reaction was terminated the pressure was released and the product removed from the autoclave. The reaction product repeatedly washed with methanol and dried. 670 grams of a wax were obtained in the form of a colorless powder having a content of 4-vinyl-azetidinone-2 of 25% by weight. The powder could be dissolved in xylene to a clear solution. The intrinsic vicvosity [η] in xylene at 85° C. was 0.16 dl./g. The product had a density of 0.942 g./ml. at 20° C. The penetration according to DIN 51,579 was 1.0×10$^{-1}$ mm. The crystallization point was found to be at 98° C. The point of crystallization is the turning point of the cooling curve of a sample heated at a temperature above the melting point.

EXAMPLE 3

Polymerization was carried out as described in Example 2. To a mixture of 200 grams of 4-vinyl-azetidinone-2 and 2000 milliliters of benzene in an autoclave with stirrer a solution of 20 grams of di-tert.butyl peroxide in 100 milliliters of benzene was added over a period of 85 minutes, while maintaining an ethylene pressure of 500 atmospheres at 180° C. 1450 grams of a waxy copolymer having a content of 4-vinyl-azetidinone-2 of 9% by weight were obtained. The copolymer had the following properties:

intrinsic viscosity: 0.39 dl./g., measured in xylene at 85° C.
density: 0.927 g./ml.
penetration according to DIN 51,579: 1.2×10$^{-1}$ mm.
crystallization point: 96° C.
characteristic IR bands at 3290, 2930, 1760, 1660, 1520, 1470, 734 and 723 cm.$^{-1}$
number average of molecluar weight $\bar{M}_n$=4500, determined in the vapour pressure osmometer in 1,2-dichlorobenzene at 130° C.
weight average of molecular weight $\bar{M}_w$=14,000, calculated from the relation of [η]-$\bar{M}_w$ for low pressure polyethylene
$\bar{M}_w:\bar{M}_n$=3.1

EXAMPLES 4–8

A solution of azobisisobutyronitrile (AIBN) in 400 milliliters of methyl acetate was added to a mixture of the amount of 4-vinyl-azetidinone-2 indicated in Table 1 in 400 milliliters of methyl acetate in an autoclave at a temperature of 140° C. and under an ethylene pressure of 2000 atmospheres. The specified pressure and temperature conditions were maintained constant during the course of the reaction. The following results were obtained:

Elementary analysis: found (percent): C, 54.2; H, 5.2; N, 8.2

TABLE 1

| Example No. | Grams | | | Percent by weight of 4-vinyl-azetidinone-2 units in polymer | [η] (dl./g.) | $D^{20}$ (g./ml.) | Penetration DIN 51-579 (mm. $10^{-1}$) |
| | 4-vinyl-azetidinone-2 | AIBN | Polymer | | | | |
| --- | --- | --- | --- | --- | --- | --- | --- |
| 4 | 200 | 20 | 490 | 24.6 | 0.19 | 0.947 | 0.9 |
| 5 | 100 | 10 | 650 | 11.4 | 0.31 | 0.937 | 0.6 |
| 6 | 50 | 5 | 480 | 6.2 | 0.42 | 0.931 | 0.2 |
| 7 | 25 | 2 | 350 | 3.5 | 0.64 | 0.929 | 0.1 |
| 8 | 15 | 1 | 380 | 1.7 | 0.81 | 0.930 | 0.1 |

NOTE.—[η]=intrinsic viscosity in xylene at 85° C.

EXAMPLE 9

A solution of 5 grams of crotonic acid and 5 grams of azobisisobutyronitrile in 200 milliliters of methyl acetate was added at 140° C. under an ethylene pressure of 2000 atmospheres over a period of 1 hour by means of a dosing pump to a mixture of 400 milliliters of methyl acetate and 50 grams of 4-vinyl-azetidinone-2 in an autoclave. The ethylene pressure of 2000 atmospheres was maintained constant during polymerization by forcing in ethylene. 450 grams of a terpolymer consisting of 0.35% of crotonic acid units, 10.4% of 4-vinyl-azetidinone-2 units and 89.25% of ethylene units were obtained. The terpolymer had an intrinsic viscosity of 0.46 dl./g., measured in xylene at 85° C., density of 0.928 g./ml. and a penetration of $0.4.10^{-1}$ according to DIN 51,579. It was completely soluble in boiling xylene.

EXAMPLE 10

4-vinyl-azetidinone-2 and vinyl acetate were copolymerized in a flask provided with reflux condenser under a nitrogen blanket under the following conditions (solution as well as substance polymerization took place in homogeneous phase):

| No. | Composition of starting mixture, parts | | | | Temp., ° C. | Time, hrs. | Yield, parts |
| | Vinyl acetate | 4-vinyl-azetidinone-2 | Ethyl acetate | AIBN | | | |
| --- | --- | --- | --- | --- | --- | --- | --- |
| 10-1 | 36.6 | 7.3 | 42 | 0.082 | 70 | 4 | 3.0 |
| 10-2 | 21.5 | 24.2 | 40 | 0.082 | 70 | 4 | 1.0 |
| 10-3 | 21.5 | 24.2 | | 0.164 | 75 | 30 | 7.5 |

After the indicated polymerization period the monomers in excess were distilled off, ether was added to the residue and the colorless solid obtained was dissolved in chloroform and precipitated with ether. The copolymers obtained had the following properties:

content of 4-vinyl-azetidinone-2-units (percent): 10–1, 20.4; 10–2, 55.4; 10–3, 58.0 (calculated from elementary analysis)
intrinsic viscosity (dl./g.): 10–1, 0.12; 10–2, 0.05; 10–3, 0.07 (measured in dimethyl formamide at 25° C.)
characteristic IR bands at 3280, 1770 cm.$^{-1}$ (4-vinyl-azetidinone-2 unit); 1720, 1240, 1020 cm.$^{-1}$ (vinyl-acetate unit)
copolymerization parameters (definition cf. Polymer Handbook, Interscience Publishers, New York, 1966, page II/141

$r_1$=0.83 (vinyl acetate)
$r_2$=0.6 (vinylazetidinone-2)

EXAMPLE 11

In a flask provided with stirrer, reflux condenser and thermometer, 25 parts of 4-vinyl-azetidinone-2, 25 parts of maleic anhydride, 0.5 part of azobisisobutyronitrile and 100 parts of benzene were heated for 16 hours at 80° C. The copolymer which separated was filtered off, dissolved in dimethyl formamide and precipitated with ether. 8 parts of copolymer were obtained.

calculated for 1:1 copolymer (percent): C, 55.4; H, 4.62; N, 7.18
characteristic IR bands at 3280, 1760 cm.$^{-1}$ (4-vinyl-azetidinone-2 unit)

EXAMPLE 12

Under a nitrogen blanket, 90 parts of n-vinylmethyl acetamide, 10 parts of 4-vinyl-azetidinone-2, 200 parts of isopropanol and 1.6 parts of azobisisobutyronitrile were heated for 6 hours at 70° C. A viscous solution was obtained from which by precipitation with ether 77 parts of a colorless solid were obtained. The product was dissolved twice in isopropanol and precipitated with ether. It had the following properties:

elementary analysis (percent): C, 60.0; H, 9.5; N, 13.9; O, 16.5
intrinsic viscosity: 0.1 dl./g., measured in water at 25° C.
characteristic IR bands at 3230, 1760 cm.$^{-1}$ (4-vinyl-azetidinone-2 unit), 1640 cm.$^{-1}$ (N-vinyl-methyl-aceamide unit)

It was soluble in water, in alcohols of low molecular weight, aqueous polar solvents and insoluble in aliphatic and aromatic hydrocarbons, in ethers and acetone.

EXAMPLE 13

Under a nitrogen blanket, 20 parts of 4-vinyl-azetidinone-2, 20 parts of vinylisobutyl ether and 0.7 part of azobisisobutyronitrile were heated for 24 hours at 80° C. The unreacted monomers were distilled off and ether was added to the residue. 6.5 parts of a colorless solid were obtained which after dissolution in acetone and precipitation with ether had the following properties:

elementary analysis (percent): C, 63.4; H, 8.6; N, 12.1 from which a content of 4-vinyl-azetidinone-2 of 84% was calculated;

intrinsic viscosity: 0.04 dl./g., measured in acetone at 25° C.
characteristic IR bands at 3310, 1760 cm.$^{-1}$ (4-vinyl-azetidinone-2-unit), 1090 cm.$^{-1}$ (vinylisobutyl ether unit)

The product was soluble in acetone, dimethyl formamide, dimethyl sulfoxide and insoluble in aliphatic and aromatic hydrocarbons and in ether.

EXAMPLE 14

A solution of 1000 parts of distilled, oxygen-free water, 2 parts of ammonium peroxy-disulfate and 0.4 part of sodium bisulfite was purged with nitrogen and, while stirring, a mixture of acrylonitrile and 4-vinyl-azetidinone-2 in the composition specified in the following table was added. The temperature of the mixture was maintained at 20 to 30° C. while stirring.

After the period of reaction indicated in the table the precipitated colorless solid was separated by filtration. The emulsions obtained with high contents of 4-vinyl-azetidinone-2 were broken with calcium chloride solution of 10% strength. The reaction products were carefully washed with water and then with acetone and dried in a vacuum exsiccator.

| Example No. | Composition of starting mixture, parts | | Polymerization period, hrs. | Yield, parts |
|---|---|---|---|---|
| | Acrylonitrile | 4-vinyl-azetidinone | | |
| 14-1 | 53 | 97 | 24 | 30 |
| 14-2 | 95 | 20 | 16 | 74 |
| 14-3 | 100 | 10 | 16 | 91 |

With samples dissolved in dimethyl formamide and precipitated with methanol/water mixtures 1:1 the following properties were found:

| Property | Example No. | | |
|---|---|---|---|
| | 14-1 | 14-2 | 14-3 |
| Content of 4-vinyl-azetidinone-2 (elementary analysis), percent | 26 | 10 | 6 |
| Intrinsic viscosity dl./g. (in dimethyl formamide at 25° C.) | 1.0 | 2.0 | 2.6 | characteristic IR bands at 3310, 1760 cm.$^{-1}$ (4-vinyl-azetidinone, 2 unit) 2230 cm.$^{-1}$ (acrylonitrile unit)

The reaction products were soluble in dimethyl formamide, dimethyl sulfoxide, insoluble in aliphatic and aromatic hydrocarbons, alcohols, ethers, esters and ketones.

By the light scattering method in dimethyl formamide at 25° C. the product of Example 14-2 was found to have a number average of the molecular weight of 600,000.

The copolymerization parameters were determined for $r_1 = 4.0$ (acrylonitrile)

$r_2 = 0.01$ (4-vinylazetidinone-2)

EXAMPLE 15

50 parts of 2-ethylhexyl-acrylate, 30 parts of styrene, 10 parts of 4-vinyl-azetidinone-2, 75 parts of xylene, 25 parts of n-butanol, 1.6 parts of azobisisobutyronitrile and 0.4 part of tertiary butyl perbenzoate were purged with nitrogen, heated for 6 hours at 80° C. and for a further 12 hours at 100° C. In a comparative experiment a mixture of the same composition which did not contain 4-vinyl-azetidinone-2 was treated under identical conditions. Colorless solutions were obtained having a relative viscosity of 50, measured at 25° C. in comparison with a mixture of 75 parts of xylene and 25 parts of n-butanol. To characterize the polymer a fraction of the solutions was admixed with methanol and the reaction products were isolated in the form of soft tacky substances.

elementary analysis (percent): C, 79.1; H, 9.5; N, 0.8
comparative experiment (percent): C, 79.8; H, 10.0; N, 0.

From the nitrogen percentage a content of 5.5% of 4-vinyl-azetidinone-2 was calculated.

characteristic IR bands at 3270, 1760 cm.$^{-1}$ (4-vinyl-azetidinone-2 unit), 1930, 1860, 1595 cm.$^{-1}$ (styrene unit) 1720 cm.$^{-1}$ (2-ethylhexyl-acrylate unit)

The solution obtained was spread on a glass plate, the solvent was substantially evaporated and the plate was heated for 1 hour at 150° C. A hard lustrous film was obtained which was insoluble in xylene. The film made from the solution of the comparative experiment was soft and tacky and soluble in xylene.

What is claimed is:

1. A homopolymer of 4-vinyl-azetidinone-2 having a main chain which consists of —C—C— linkages and has lateral azetidinone rings of the formula

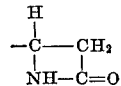

said polymer having an average molecular weight of 1000 to 50,000 and an intrinsic viscosity of from 0.02 to 5 dl./g. measured in dimethyl formamide at 25° C.

2. A linear random addition copolymer consisting of 99 to 0.5% by weight of 4-vinyl-azetidinone-2 structural units and 1 to 99.5% by weight of structural units of at least one ethylenically unsaturated monomer copolymerizable with said azetidinone, said copolymer having a main chain consisting of —C—C— linkages and a molecular weight of 1000 to 1,000,000.

3. A linear random addition copolymer having a main chain consisting of —C—C— linkages, said copolymer consisting essentially of 99 to 0.5% by weight of 4-vinyl-azetidinone-2 structural units and 1 to 99.5% by weight of structural units of at least one ethylenically unsaturated monomer copolymerizable with said azetidinone, said copolymer having lateral azetidinone rings of the formula

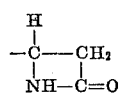

and a molecular weight of 1000 to 200,000.

References Cited

UNITED STATES PATENTS 3,153,640  10/1964  Barnum et al. _____ 260—86.1

FOREIGN PATENTS 1,245,589  7/1967  Germany _____ 260—88.3

OTHER REFERENCES

Chemical Abstracts, 70, 88440 (x).
Chemical Abstracts, 69, 106,353 (g).

JOSEPH L. SCHOFER, Primary Examiner

S. M. LEVIN, Assistant Examiner

U.S. Cl. X.R.

117—124 E; 260—29.6 HN, 30.4 N, 30.8 DS, 32.6 N, 32.8 N, 33.4 R, 33.6 UA, 33.8 UA, 78 L, 78.5 R, 79.7, 80.3 R, 80.3 E, 80.3 N, 80.72, 82.1, 85.5 B, 85.7, 86.1 N, 86.1 R, 87.5 E, 87.7, 88.1 R, 88.1 PA